United States Patent

[11] 3,609,554

[72] Inventor Albert Stoker
Emmasingel, Eindhoven, Netherlands

[21] Appl. No. 767,948
[22] Filed Oct. 16, 1968
[45] Patented Sept. 28, 1971
[73] Assignee U.S. Philips Corporation
New York, N.Y.
[32] Priority Oct. 18, 1967
[33] Netherlands
[31] 6714120

[54] CIRCUIT ARRANGEMENT FOR SWITCHING AN ELECTRICAL SIGNAL
4 Claims, 6 Drawing Figs.

[52] U.S. Cl. .......... 325/346, 307/237, 307/317, 325/348, 325/480
[51] Int. Cl. .......... H03d 3/00, H03k 7/00
[50] Field of Search .......... 307/231, 317, 271, 233, 237, 236; 325/346, 348, 480

[56] References Cited

UNITED STATES PATENTS

| | | | |
|---|---|---|---|
| 2,761,130 | 8/1956 | Kibler .......... | 307/317 X |
| 3,188,491 | 6/1965 | Bahn .......... | 307/317 X |

*Primary Examiner*—John S. Heyman
*Assistant Examiner*—B. P. Davis
*Attorney*—Frank R. Trifari

ABSTRACT: A circuit for switching a connection point from variable signal to a reference potential, employing a transistor having its control electrode connected to a variable DC voltage, and its emitter-collector path connected by resistors between a potential divider and a reference point. A pair of similarly poled diodes are connected across the emitter-collector path, the junction of said diodes connected to said connection point.

Figures 1, 2:
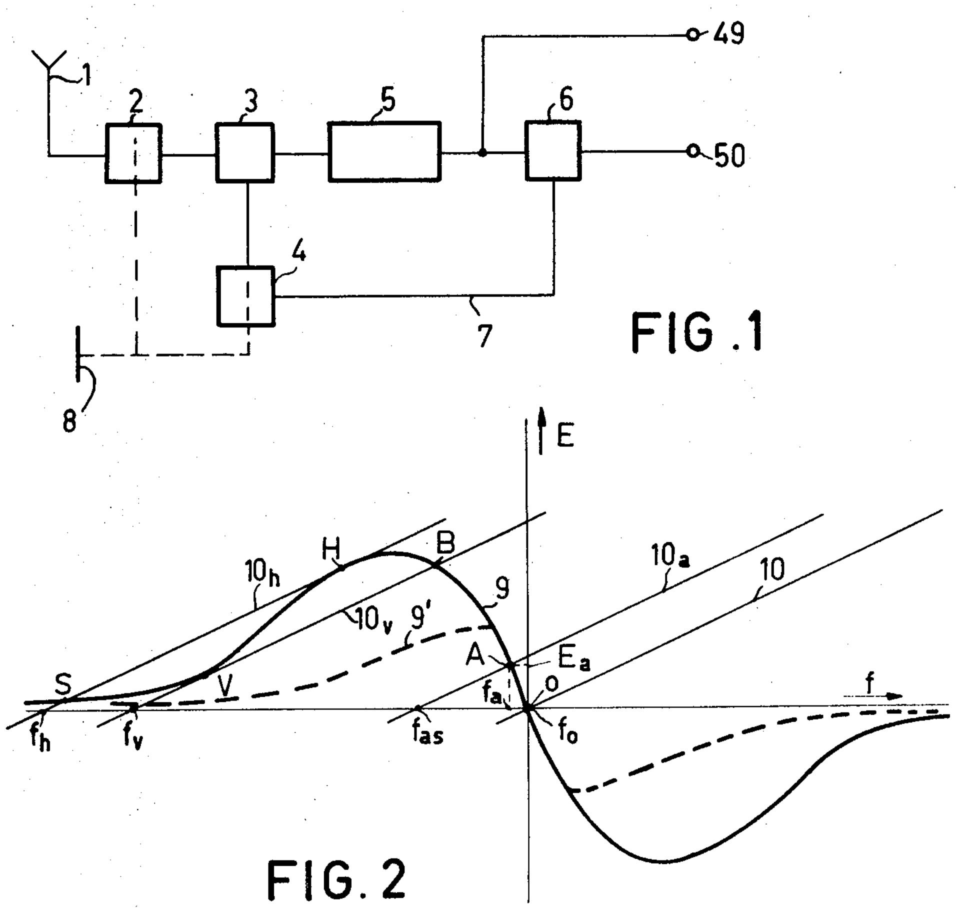

INVENTOR.
ALBERT STOKER
BY
Frank R. [signature]
AGENT

INVENTOR.
ALBERT STOKER
BY
Frank R. Trifari
AGENT

CIRCUIT ARRANGEMENT FOR SWITCHING AN ELECTRICAL SIGNAL

The invention relates to circuit arrangement for switching an electrical signal which can be varied both positively and negatively relative to a reference potential, said reference potential being selectively set up at a connection for the transmission of the signal as a function of a DC voltage controlling the circuit arrangement.

In certain cases it is desirable to switch off a signal which can be varied positively and negatively relative to a reference potential, so that in the switched off condition the connection carrying this signal is brought to said reference potential. In principle this may already be effected by means of a single switch which is provided between the connection and a point carrying this reference potential. A relay may be used if the switching function is to be realized by means of a DC voltage or direct current controlling the switch. Relays are, however, expensive, they require comparatively much control energy and, in addition, they are sensitive to mechanical shocks. To realize the above-mentioned switching function it is therefore desirable to have a fully electronic circuit arrangement available.

It is an object of the invention to provide a fully electronic circuit arrangement for the switching function as described in the preamble, which circuit arrangement is simple and, in addition, can be constructed in the form of an integrated circuit, the circuit arrangement according to the invention being characterized in that the circuit arrangement comprises a transistor having a control electrode and first and second output electrodes, the DC voltage controlling the circuit arrangement being applied to said control electrode, a voltage supply source having a positive and a negative terminal, first resistance means included between the first output electrode of the transistor and the positive terminal of the voltage supply source, second resistance means included between the second output electrode of the transistor and the negative terminal of the voltage supply source, and first diode means the anode of which is connected to the first output electrode of the transistor and second diode means the cathode of which is connected to the second output electrode of the transistor, the cathode of the first diode means and the anode of the second diode means being connected together and to the said connection for the transmission of the signal.

The circuit arrangement according to the invention may be used in, for example, a receiver for the reception of electrical signals for automatically switching on or switching off, as a function of the tuning of the receiver, an automatic frequency control provided in the receiver.

Figure 3:
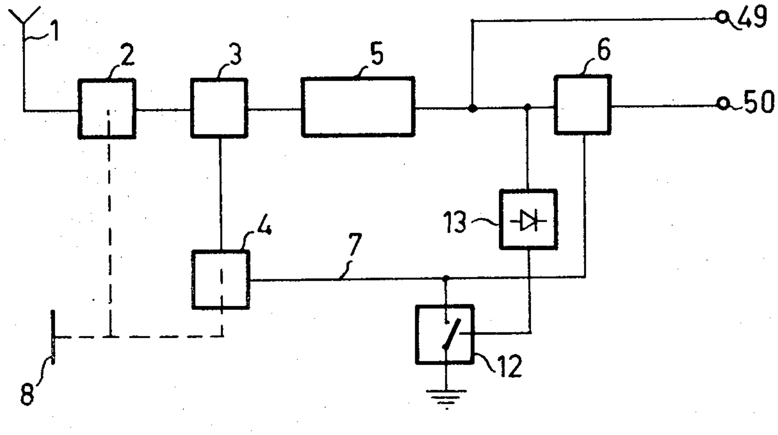
Figure 4A:
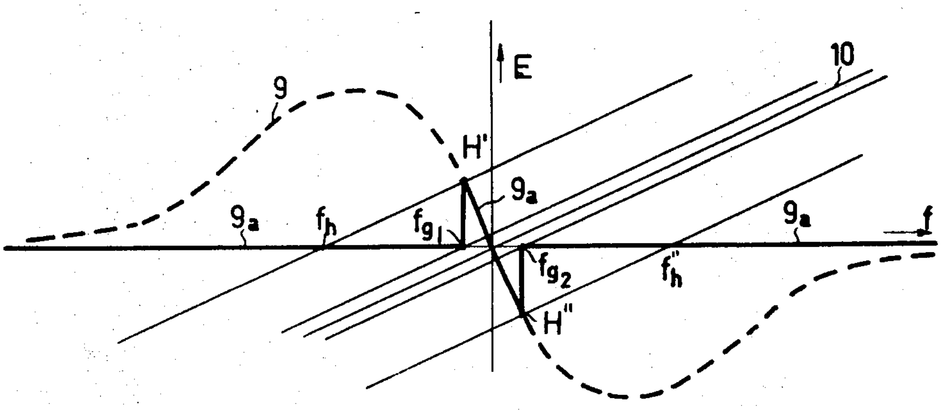
Figure 4B:
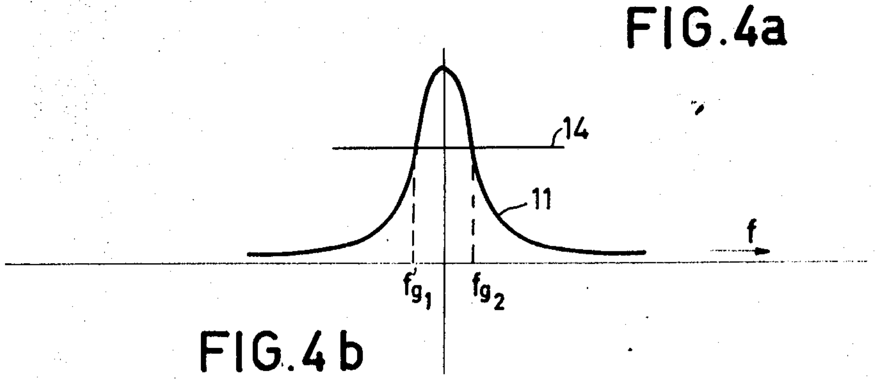
Figure 5:
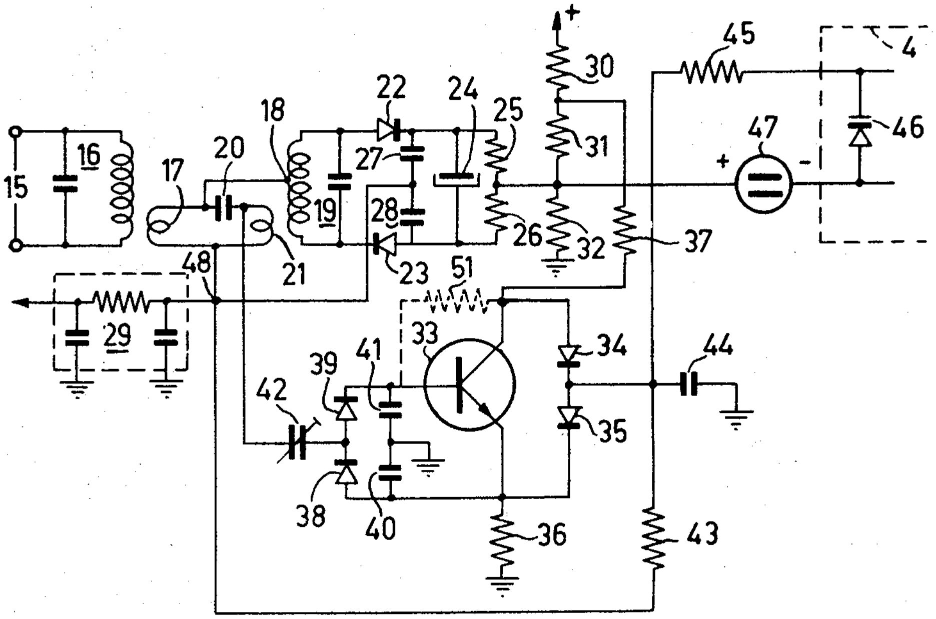

In order that the invention may be readily carried into effect, it will now be described in detail by way of example with reference to the accompanying diagrammatic drawings, in which:

FIG. 1 shows a circuit diagram of a receiver with automatic frequency control,

FIG. 2 shows a few diagrams which serve to clarify the operation of the receiver of FIG. 1, FIG. 3 shows the circuit diagram of a receiver with automatically switched automatic frequency control, FIGS. 4*a* and 4*b* show a few diagrams which serve to clarify the operation of the circuit arrangement of FIG. 3 and FIG. 5 shows a further elaborated receiver of FIG. 3, including a circuit arrangement according to the invention.

In the circuit diagram of FIG. 1 the high-frequency signals are applied to a mixer stage 3 with the aid of an aerial 1 and after amplification in a high-frequency amplifier stage 2. A local oscillator 4 provides an oscillator signal which is likewise applied to the mixer stage 3. An intermediate-frequency signal is formed from the aerial signal and the oscillator signal in the mixer state, the carrier frequency of said intermediate-frequency signal being, for example, equal to the difference between the oscillator frequency and the carrier frequency of the aerial signal.

The intermediate-frequency signal is applied, after amplification in an intermediate-frequency amplifier 5, to a discriminator 6 which provides a voltage which is dependent on the frequency of the intermediate-frequency signal. This voltage is applied through a connection 7 to a variable reactance which forms part of the oscillator 4 and which determines the frequency at which the oscillator oscillates. The frequency of the oscillator may be varied, not only by this discriminator voltage but also externally, for example, with the aid of a turning knob which is diagrammatically shown in FIG. 1 and indicated by 8. In many cases the high-frequency amplifier stage 2 is also tuned to the aerial signal with the aid of the knob 8.

FIG. 1 further shows two outputs 50 and 49 from which the low-frequency signal provided by the discriminator 6 and the intermediate-frequency signal provided by the intermediate-frequency amplifier 5 can be derived.

Curve 9 of FIG. 2 shows the relation of the voltage E applied to line 7 by the discriminator 6 as a function of the carrier frequency $f$ of the intermediate-frequency signal applied to the discriminator. It has been assumed that a symmetrical discriminator is used so that the curve 9 lies symmetrically relative to the central frequency $f_o$ of the discriminator. At this central frequency the discriminator voltage is zero if the frequency of the intermediate-frequency signal deviates from this central frequency the discriminator voltage is positive or negative dependent on whether the carrier frequency of the intermediate-frequency signal deviates from the central frequency $f_o$ in a negative or positive sense.

Curve 10 of FIG. 2 further shows the relation between the voltage applied to the variable reactance and the frequency over which the oscillator is shifted as a result of this voltage. It has been assumed in FIG. 2 that this relation is linear, but nothing essentially changes in the operation of the circuit arrangement if the curve 10 is tightly curved.

The point of intersection of the curves 9 and 10 determines the condition of which the circuit arrangement operates. In FIG. 2 this point of intersection 0 lies at the central frequency $f_o$ of the discriminator. This means that the frequency of the intermediate-frequency signal is equal to the central frequency of the discriminator; the discriminator therefore does not apply voltage to the line 7 and the oscillator frequency is therefore fully determined by the position of the tuning knob 8 which is such that the receiver is exactly tuned to a transmitter signal received by the aerial 1. In fact, this transmitter signal together with the oscillator signal provides the intermediate-frequency signal the frequency of which is exactly equal to the central frequency $f_o$ of the discriminator.

In the diagram of FIG. 2 a rotation of tuning knob 8 may be represented by a parallel displacement of the curve 10 along the frequency axis, for example, up to the position of this curve indicated by 10*a*. As a result the point of intersection of the curve 10 with the horizontal frequency axis shifts over a distance $f_o$–$f_{as}$ which distance represents the frequency shift which would occur as a result of the rotation of the tuning knob if the oscillator were not readjusted through the line 7. Therefore this is also the frequency shift which can be read on the tuning dial usually coupled with the tuning knob 8.

The frequency shift which actually occurs is, however, considerably smaller as a result of the automatic frequency control through the line 7 and may be derived from the point of intersection A of the curve 10*a* with the curve 9. The frequency associated with this point of intersection is indicated by $f_a$ in FIG. 2. Consequently, this is the intermediate frequency which is applied to the discriminator. As a result the discriminator supplies a positive voltage E*a* under the influence of which the oscillator frequency is controlled over a distance $f_a$–$f_{as}$. As a result the frequency of the intermediate-frequency signal is shifted over the same distance in the direction of the central frequency of the discriminator.

Upon further rotation of the tuning knob 8 a further parallel shift of the curve 10 occurs which is attended with a further displacement of the point of intersection A along the curve 9. This ends as soon as the curve 10 has reached the position indicated by $10_h$ where this curve contacts the curve 9 at the point H. In this position the voltage originating from the discriminator is no longer sufficient to cause the required frequency shift of the oscillator and the operating point of the circuit arrangement jumps to the point of intersection indicated by S; this position indicates the limit of the holding range of the AFC-circuit arrangement. The point of intersection of the curve $10_h$ which the horizontal frequency axis shows by means of $f_h$ the limit of the holding range which can be read on the tuning dial. Since a corresponding situation occurs for the negative part of the curve 9 the total holding range read on the tuning dial is approximately twice the frequency distance $f_o$–$f_h$.

If the tuning knob 8 is subsequently rotated again in the opposite sense the curve 10 shifts from the position indicated by $10_h$ towards the central frequency $f_o$. The operating point of the circuit arrangement then shifts along the curve 9 from the point S to the point indicated by V which is the tangent point of the curve 9 with the curve 10 when this curve has reached the position indicated by $10_v$. In this position the operating point of the circuit arrangement jumps from point V to the point of intersection of the curves 9 and $10_v$ indicated by B so that the transmitter signal is caught again. The point of intersection $f_v$ of the curve $10_v$ with the horizontal frequency axis indicates the frequency on the turning dial at which catching is effected.

The frequencies $f_h$ and $f_v$ indicate the limits of the holding and catching ranges, respectively, on the tuning dial. In a circuit arrangement as shown in FIG. 1 for reception of transmitter signals which are relatively shifted in frequency by 300 kc./s. the limits of the holding and the catching range may be remote from the exact tuning frequency by 600 and 500 kc./s., respectively. However due to the disturbing influence of neighbor-transmitters on the turning such large holding and catching ranges are undesirable.

It is possible to reduce the holding range and the catching range by decreasing the control amplification of the circuit arrangement so that a certain frequency deviation in the discriminator readjusts the frequency of the oscillator over a smaller distance. As a result the curve 10 and hence of course the shifted positions indicated by **10*a*, 10*v* and 10*h*** of this curve become more vertical. The circuit arrangement for the automatic frequency control therefore becomes much less effective, however, so that the desired transmitter signal is brought much less close to the central frequency $f_o$ of the discriminator.

It is known to limit the control voltage originating from the discriminator 6, for example, with the aid of a voltage dependent on the intermediate-frequency signal so that the control voltage curve acquires a shape as is shown by means of the broken line curve 9' in FIG. 2. Although by this step a transmitter signal exerts less influence on the tuning of an adjacent transmitter it has been found in practice that this influence may still assume very disturbing values.

A more improved method is shown in the circuit diagram of FIG. 3. In this FIG. the functional units corresponding to those of FIG. 1 are indicated by the same reference numerals.

The circuit arrangement of FIG. 3 includes a switch 12 shown diagrammatically with which the control voltage, which is applied through the line 7 of the discriminator 6 to the oscillator 4, can be short-circuited. Furthermore the circuit arrangement of FIG. 3 includes a rectifier 13 by means of which the intermediate-frequency voltage amplified by the intermediate-frequency amplifier 5 is rectified. The DC voltage generated by the rectifier 13 controls the switch 12 in such manner that it is opened when the frequency of the intermediate-frequency carrier is located within a frequency range about the central frequency $f_o$ of the discriminator. If the frequency of the intermediate-frequency carrier is located outside this frequency range the switch 12 is closed and thus the supply of the control voltage to the oscillator 4 is switched off.

The operation of the circuit arrangement of FIG. 3 will further be described with reference to the diagrams shown in FIGS. **4*a* and 4*b***.

In FIG. **4*a* the voltage applied by the discriminator 6 to the line 7 is shown as a function of the IF carrier frequency by means of the broken line curve 9**.

In FIG. **4*b* the DC voltage provided by the rectifier 13 as a function of the IF carrier frequency is shown by means of the curve 11. The rectifier 13 is preferably connected to an IF resonant circuit of the IF amplifier 5 or of the discriminator 6, the selectivity of which is high so that the DC voltage provided by the rectifier 13** greatly varies with the IF carrier frequency.

The switch 12 is controlled by means of the output DC voltage of the rectifier 13. The switch 12 is constructed in such manner that it is closed when the DC voltage originating from the rectifier 13 lies under a certain threshold value indicated by the line 14 in FIG. **4*b*. If the DC voltage of the rectifier 13 lies above this threshold value the switch 12** is open.

Since the rectifier 13 provides a voltage which reaches the highest values for IF carrier frequencies located in a frequency range about the central frequency $f_o$ it is achieved in the manner described above that the switch 12 is open in this frequency range shown by the limits $f_g$ , $f_g$ in FIGS. **4*a* and 4*b*. The switch 12 is closed outside this frequency range and therefore no control voltage of the discriminator is applied to the oscillator 4**.

Consequently, a voltage dependent on the IF carrier frequency is applied to the oscillator 4 as is shown by the new curve **9*a* in FIG. 4*a*. For IF carrier frequencies which are lower than the limit frequency $f_g$ this curve coincides with the horizontal frequency axis; for IF carrier frequencies which are located between the limit frequencies $f_{g1}$ and $f_{g2}$ the new curve 9*a* coincides with the curve 9 and for IF carrier frequencies above the limit frequency $f_{g2}$ the curve 9*a*** again coincides with the horizontal frequency axis.

FIG. **4*a* also shows the curve 10** which indicates the relation between the control voltage applied to the variable reactance of the oscillator and the frequency shift caused by this control voltage.

The catching range and the holding range of the circuit arrangement of FIG. 3 may be determined similarly as described in FIG. 2 by shifting the curve 10 parallel to the horizontal frequency axis and by finding the tangent points of the shifted curves 10 with the curve **9*a*. The tangent point which determines the lower limit of the holding range is indicated by H' in FIG. 4*a* and the tangent point which determines the upper limit of the holding range is indicated by H''. The shifted curve 10 which passes through the tangent point H' intersects the horizontal frequency axis at the point indicated by $f'_h$ and the shifted curve 10** which passes through the tangent point H'' intersects the horizontal frequency axis in the point indicated by $f''_h$. The area of the holding range which can be read on the tuning dial is equal to the frequency distance $f_h''$ –$f_h'$. The tangent point which determines the lower limit of the catching range lies at the point of the horizontal frequency axis indicated by $f_{g1}$ and likewise the tangent point which determines the upper limit of the catching range lies at the point of the horizontal frequency axis indicated by $f_{g2}$. Since these tangent points are located on the horizontal frequency axis, the frequency range $f_{g2}$–$f_{g1}$ is at the same time the catching range of the circuit arrangement as can be read on the tuning dial.

As follows from the diagrams of FIG. **4*a* the holding range and the catching range of the circuit arrangement of FIG. 3 are considerably smaller than the holding range and the catching range of the circuit arrangement of FIG. 1**, while yet a satisfactory control amplification is maintained.

In order to tune to a transmitter signal the tuning must be brought within the catching range indicated by the limits $f_{g1}$ and $f_{g2}$, the oscillator being readjusted to such an extent that the discriminator is substantially operative at the central frequency $f_o$. The tuning may subsequently be shifted to the limits of the holding range $f_h'$ and $f_h''$, the AGC circuit arrangement readjusting the oscillator frequency in such manner that the discriminator remains operative in a range between the limits $f_{g1}$ and $f_{g2}$ of the holding range the operating point of the circuit arrangement jumps to the horizontal frequency axis and consequently no frequency control at all takes place so that also the turning to an adjacent transmitter located outside this holding range is not influenced.

The discriminator 6 often has the property that it is practically insensitive to interferences only when the IF carrier frequency lies within a small frequency range about the central frequency of the discriminator. As the carrier frequency is further removed from the central frequency outside this frequency range of minimum interference the sensitivity to interference quickly increases. In the circuit arrangement of FIG. 3 the frequency range $f_{g2}$–$f_{g1}$ within which the switch 12 is open is preferably chosen to be approximately equal to the frequency range of minimum interference so that with a transmitter signal caught the discriminator is always operative within this range of minimum interference. In a circuit arrangement of FIG. 3 and tested in practice, which served for the tuning of a car-radio receiver, the limits $f_{g1}$ and $f_{g2}$ within which the switch 12 is open were adjusted at ±40 kc./s. from the central frequency $f_o$ of the discriminator. The limits of the holding range were adjusted at ±240 kc./s. from the central frequency $f_o$Since the transmitter frequencies are usually 300 kc./s. remote from each other the tuning to a transmitter signal in a circuit arrangement thus proportioned cannot be disturbed by a neighboring transmitter signal.

FIG. 5 shows an elaborated embodiment of the circuit arrangement of FIG. 3. The intermediate-frequency signal which originates, for example, from an IF amplifier is applied to the terminals 15 of a first resonant circuit 16 tuned to the nominal IF carrier frequency. A coupling winding 17 magnetically coupled to this circuit applies the intermediate-frequency signal to a tapping 18 of a second resonant circuit 19 tuned to the nominal intermediate frequency. The signal of the winding 17 is also applied through a small capacitor 20 to a coupling winding 21 magnetically coupled to the resonant circuit 19 so that the circuit 19 is excited. The two ends of the circuit 19 are connected through diodes 22 and 23, respectively, to a network comprising a parallel arrangement of a large capacitor 24, two series-arranged resistors 25 and 26 and two series-arranged capacitors 27 and 28. The connection between the capacitors 27 and 28 is connected to the interconnected lower ends of the coupling windings 17 and 21.

The circuit elements 16 up to and including 28 together form a frequency discriminator circuit which is known under the name of ratio detector and the operation of which is known and therefore will not further be described. The interconnected lower ends of the coupling windings 17 and 21 form the output 48 of the discriminator circuit from which output the low-frequency output signal can be derived through a low-frequency filter 29. In addition the DC control voltage for the automatic frequency control is derived from the output 48.

A potentiometer comprising the resistors 30, 31 and 32 is connected between the positive terminal (+) and the negative terminal (earth) of a supply voltage source. Said resistors are chosen to be such that a DC voltage of +2 Volts occurs, for example, between the resistors 30 and 31 and a DC voltage of +1 Volt relative to earth between the resistors 31 and 32. The latter DC voltage is applied to the junction of the discriminator resistors 25 and 26 thus forming the reference voltage of the discriminator.

The circuit arrangement furthermore includes an electronic switch consisting of a transistor 33 and two series-arranged diodes 34 and 35 polarized in the same direction which are included between the collector and the emitter of the transistor 33. The emitter is furthermore connected to earth through a resistor 36 and the collector is connected through an equally large resistor 37 to the +2 Volt junction of the resistors 30 and 31.

A rectifier is connected between the base and the emitter of the transistor 33 which rectifier also acts in known manner as a voltage doubler. Said rectifier is formed by two diodes 38 and 39 connected in series between base and emitter and two smoothing capacitors 40 and 41. The intermediate-frequency signal to be rectified is applied to the junction of the diodes 38 and 39 through an adjustable capacitor 42. This signal is derived from the coupling winding 21 coupled with the secondary discriminator circuit 19. In many cases it is preferred to derive the intermediate-frequency signal to be rectified from this circuit, because the selectivity on this point of the receiver is usually the greatest.

The control voltage for the automatic frequency control originating from the output 48 of the discriminator is applied through a resistor 43 to the junction of the diodes 34 and 35. A capacitor 44 connected to this junction serves to remove the low-frequency signal still present on the control voltage to earth. The control voltage is subsequently applied through a resistor 45 to the cathode of a variable capacity diode 46 of which, as is known, the capacitance is dependent on the voltage set up in the cutoff direction. This variable capacity diode is included in the oscillator circuit (not shown) of the local oscillator 4 of the receiver. A DC voltage source 47 diagrammatically shown, which, for example, may be formed by a biased Zener diode, is connected between the anode of the variable capacity diode 46 and the reference voltage of the ratio detector present on the junction of the resistors 31 and 32. The DC-voltage source 47 keeps the variable capacity diode in the cutoff direction for all values of the control voltage provided through the resistor 45.

The operation of the circuit arrangement of FIG. 5 is as follows.

If the amplitude of the intermediate-frequency signal applied through the capacitor 42 to the rectifier diodes 38 and 39 is small, that is to say, smaller than the threshold value 14 indicated in FIG. 4*b*, the DC voltage generated by the rectifier diodes between the base and the emitter of the transistor 33 is insufficient to cause this transistor to conduct. As a result of the positive voltage of +2 Volt to which the branch consisting of the resistor 37, the diodes 34 and 35 and the resistor 36 is connected, a DC current flows to earth through this branch, keeping the junction between the diodes 34 and 35 at a voltage of +1 Volt, that is to say, at the reference voltage of the discriminator. The diodes 34 and 35 passing current thereby prevent the control voltage originating from the junction 48 from reaching the variable capacity diode 46.

For greater IF signal amplitudes the rectifier circuit provides so much DC voltage that the transistor 33 starts conducting. It has been assumed that the circuit arrangement is then proportioned in such manner that the transistor will soon be in the bottomed condition, the collector DC voltage being substantially equal to the emitter DC voltage. Since the resistors 36 and 38 are equally large, this voltage is +1 Volt. The diodes 34 and 35 have an internal threshold value which is approximately 0.5 Volt for silicon diodes and which ensures that these diodes only start conducting at a pass voltage which is higher than this threshold value. Since the anode of the diode 34 and the cathode of the diode 35 are substantially at the same potential of +1 Volt, the voltage on the junction of the two diodes can therefore freely vary between, for example, 1+0.5=.5 Volt and 1–0.5=0.5 Volt and within this range the control voltage originating from the junction 48 can therefore be applied unhindered through the variable capacity diode 46 to the resistors 43 and 45. It is to be noted that the circuit arrangement can be proportioned in practice in such manner that the transistor 33 is reversed and causes the diodes 34 and 35 to conduct already before the control voltage is so high that the said limits of 0.5 Volt and 1.5 Volt are reached at the junction of the diodes 34 and 35.

The amplitude of the intermediate-frequency signal applied to the rectifier diodes 38 and 39 can be adjusted with the aid of the adjustable capacitor 42 and thereby the frequency range $f_{g2}$–$f_{g1}$ within which the transistor 33 is conducting.

As follows from the diagrams of FIG. 4*a* the circuit arrangement according to FIG. 3 may have a very narrow catching range. Such a narrow catching range has, however, the drawback that the receiver already receives the transmitter signal and reproduces this signal through, for example, the loudspeaker without the circuit arrangement for the automatic frequency control being caught at this transmitter signal. The discriminator then, however, operates in a range within which the discriminator is very sensitive to interference. In a circuit arrangement according to the invention the catching range can simply be enlarged, for example, to 185 kc./s. without this being attended by an increase of the holding range by constructing the switch in such manner that it does not open or close stepwise, but progressively. This can be obtained in the circuit arrangement of FIG. 5 by choosing a type for the switching transistor 33 having a small current amplification or by providing, for example, a negative feedback resistor 51 between the collector and the base of the transistor 33. Such a negative resistor is shown in a broken line in FIG. 5.

Since when transistor 33 conducts the current flowing through the resistor 37 and hence through the resistor 30 differs from the current when the transistor is cut off the voltage at the junction of the resistors 30 and 31 and hence the reference voltage for the discriminator at the junction of the resistors 31 and 32 shows a small voltage step when switching over the transistor 33 which voltage step is applied together with the control voltage through the resistors 43 and 45 to the cathode of the variable capacity diode 46. In order to prevent this voltage step from causing an undesirable detuning of the oscillator circuit, the anode of the variable capacity diode is connected through the DC-voltage source 47 to the reference voltage of the discriminator on the junction of the resistors 31 and 32. As a result it is achieved that the same voltage step having the same polarity occurs at the anode of the variable capacity diode.

I claim:

1. Circuit arrangement for switching a connection point from an electrical signal which can be varied both positively and negatively relative to a reference potential, said reference potential being selectively provided at said connection point for the transmission of the signal as a function of a DC voltage controlling the circuit arrangement, comprising a transistor having a control electrode and first and second output electrodes, means for applying said DC voltage controlling the circuit arrangement to said control electrode, a voltage supply source having a positive and a negative terminal, first resistance means included between the first output electrode of the transistor and the positive terminal of the voltage supply source, second resistance means included between the second output electrode of the transistor and the negative terminal of the voltage supply source, and first diode means the anode of which is directly connected to the first output electrode of the transistor and second diode means the cathode of which is directly connected to the second output electrode of the transistor, the cathode of the first diode means and the anode of the second diode means being connected together and to the said connection point for the transmission of the signal.

2. A circuit arrangement as claimed in claim 1 wherein said first resistance means and said second resistance means have approximately equal resistance-values.

3. A circuit arrangement as claimed in claim 1 wherein said first and second diode means consist of diodes having a high threshold voltage in the pass direction.

4. A circuit arrangement as claimed in claim 1 further including means for coupling the signal at the cathode of the first diode means and the anode of the second diode means to an automatic frequency control circuit, and that said varying signal is a voltage obtained by rectification of a radio signal received and applied to the control electrode of said transistor for controlling the circuit arrangement.

PO-1050 (5/69)

UNITED STATES PATENT OFFICE
CERTIFICATE OF CORRECTION

Patent No. 3,609,554 Dated September 28, 1971

Inventor(s) ALBERT STOKER

It is certified that error appears in the above-identified patent and that said Letters Patent are hereby corrected as shown below:

Col. 2, line 55, "$f_o - f_{as}$" should be --$f_o - f_{as}$--;

Col. 4, line 23, "$f_g$ , $f_g$ " should be --$f_{g1}$, $f_{g2}$--;

line 30, "$f_g$" should be --$f_{g1}$--;

Col. 5, line 3, after "$f_{g2}$" insert --. If the tuning is brought outside the limits $f_{h'}$ and $f_{h''}$--;

Col. 5, line 6, "turning" should be --tuning--;

Col. 5, line 25, after "$f_o$" insert --.--;

Col. 6, line 63, "1+0.5 = .5" should be --1+0.5 = 1.5--.

Signed and sealed this 5th day of December 1972.

(SEAL)
Attest:

EDWARD M.FLETCHER,JR.
Attesting Officer

ROBERT GOTTSCHALK
Commissioner of Patents